US008850561B2

(12) United States Patent
Birgen et al.

(10) Patent No.: US 8,850,561 B2
(45) Date of Patent: Sep. 30, 2014

(54) ASSOCIATING OPERATING SYSTEM NATIVE AUTHORIZATIONS WITH CONSOLE ROLES

(75) Inventors: Gregory C. Birgen, Pflugerville, TX (US); Michael A. Bockus, Manor, TX (US); Frank P. Feuerbacher, Austin, TX (US); Michael W. Panico, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1413 days.

(21) Appl. No.: 12/197,349

(22) Filed: Aug. 25, 2008

(65) Prior Publication Data

US 2010/0050254 A1 Feb. 25, 2010

(51) Int. Cl.
*H04L 9/32* (2006.01)
*G06F 21/00* (2013.01)
*G06F 21/60* (2013.01)

(52) U.S. Cl.
CPC .................. *G06F 21/604* (2013.01)
USPC ..................... 726/21; 726/2; 713/1

(58) Field of Classification Search
CPC ....... H01L 63/08; G06F 21/31; G06F 9/4401; G06F 21/604
USPC ............ 726/1, 4, 17, 21, 28, 2; 709/225, 229; 713/172, 1
See application file for complete search history.

(56) References Cited

U.S. PATENT DOCUMENTS

| | | | | |
|---|---|---|---|---|
| 6,161,139 | A * | 12/2000 | Win et al. | 709/225 |
| 6,202,066 | B1 * | 3/2001 | Barkley et al. | 707/785 |
| 6,785,822 | B1 * | 8/2004 | Sadhwani-Tully | 726/28 |
| 6,895,512 | B1 | 5/2005 | Calbucci | |
| 7,010,600 | B1 * | 3/2006 | Prasad et al. | 709/225 |
| 7,343,628 | B2 * | 3/2008 | Buchholz et al. | 726/28 |
| 7,647,628 | B2 * | 1/2010 | Kebinger et al. | 726/17 |
| 8,024,794 | B1 * | 9/2011 | Feldman et al. | 726/21 |
| 2002/0002557 | A1 | 1/2002 | Straube et al. | |
| 2002/0156904 | A1 * | 10/2002 | Gullotta et al. | 709/229 |
| 2003/0115292 | A1 * | 6/2003 | Griffin et al. | 709/219 |
| 2003/0204740 | A1 | 10/2003 | Shapiro et al. | |
| 2006/0026557 | A1 * | 2/2006 | Petri | 717/106 |
| 2007/0022470 | A1 | 1/2007 | Yang | |

OTHER PUBLICATIONS

Dridi, F.; Muschall, B.; Pernul, G., "Administration of an RBAC system", System Sciences, 2004. Proceedings of the 37th Annual Hawaii International Conference on; Feb. 26, 2004 [retrieved from IEEE database on Apr. 13, 2012].*

Kailar, R. "ManageSecure™—An Integrated Enterprise Web Security System", 2005; pp. 1-9. [retrieved from Citeseer database on Apr. 13, 2012].*

* cited by examiner

*Primary Examiner* — Saleh Najjar
*Assistant Examiner* — Oleg Korsak
(74) *Attorney, Agent, or Firm* — Parashos Kalaitzis; Robert C. Rolnik; David Mims (57) ABSTRACT

Disclosed is a computer implemented method and apparatus to provide authorizations to an administrative user. An integrated solutions console (ISC) receives an administrative user login corresponding to a console administrative user. The ISC presents a list of at least one management task. The ISC presents at least one input interface to a display for an administrative user name and at least one console role. The ISC receives an administrative user name and a console role. The ISC obtains an authorization descriptor that can be used to couple the administrative user name and the console role.

13 Claims, 5 Drawing Sheets

ASSOCIATING OPERATING SYSTEM NATIVE AUTHORIZATIONS WITH CONSOLE ROLES

BACKGROUND OF THE INVENTION

1. Field of the Invention

The present invention relates generally to a computer implemented method, data processing system, and computer program product for delegating authorization to access data processing system features. More specifically, the present invention relates to associate roles having bundles of authorizations with console roles.

2. Description of the Related Art

Multi-user computer systems compartmentalize authority among users according to a system manager's assignment of job duties to subordinate system administrators. System administrators are permitted access to system features according to their status in an organization and job description.

To permit a computer to authenticate a user, data processing systems may challenge a user to provide a login name and a password. Once a matching login name and password, previously known in the data processing system, is entered, a user is considered logged in or engaged in a user session. A user then interacts with the data processing system by entering commands or accessing features. However, a system that has a data structure of authorizations that correspond to the user session can screen these commands or feature accesses against a list of authorizations assigned to the user. Commands that are found in this data structure are allowed and processed, while commands that are not found in this data structure can be rejected or otherwise disallowed.

Data processing systems that provide high functionality from a command line enable an administrator to establish and maintain a database of authorizations bundled in a data structure called a role. An administrative user login is a set of credentials provided by a system administrator. The set of credentials may include a user name and a password. The administrative user login can be for a root user. This user has the authority to delegate authorizations to other user logins. In addition, the administrative user login can authorize other users to themselves delegate authorizations.

An authorization is a key that enables a function for use by a user within a data processing system. The authorization may be grouped with other authorizations to form, collectively, a role. A role is one or more authorizations in combination. Authorization may be assigned from one user to a second user. Depending on the data processing system, an authorization may be assigned to a user by assigning a role to the user, where the role includes the authorization. Examples of some authorizations that may be assigned to a user include an authorization "aix.security.user.remove" to use "rmusef", an AIX® command or Advanced Interactive eXecutive command to remove a user specified on the command line. AIX® is a trademark of International Business Machines Corporation in the United States, other countries or both. A second example is an authorization "aix.security.user.change" to use "chuser" an AIX command to change attributes of a user specified on the command line. One of the attributes of the user is the roles assigned to the user. The command "chuser" is used to remove roles from a user or add roles to a user. Since a role is a collection of authorizations, removing a role from a user through "chuser" command actually removes one or more authorizations from the user.

Other operating systems may bundle authorizations according to operating system native roles. The authorizations, so bundled, are called operating system native authorizations. An operating system native role is a data structure that bundles two or more authorizations of an operating system into a single named role, such that the role may be assigned to a user based on user identifier or user name. An operating system native authorization can be, for example, an AIX authorization.

A challenge faced by system administrators in such systems is that operating system native roles are not bundled together to a matching console role. Accordingly, benefits of navigating management tasks may not accrue without significant manual labor by the system manager to define console roles in a manner that relies on operating system native roles.

SUMMARY OF THE INVENTION

The present invention provides a computer implemented method and apparatus to provide authorizations to an administrative user. An integrated solutions console (ISC) receives an administrative user login corresponding to a console administrative user. The ISC presents a list of at least one management task. The ISC presents at least one input interface to a display for an administrative user name and at least one console role The ISC receives an administrative user name and a console role. The ISC obtains an authorization descriptor that can be used to couple the administrative user name and the console role.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
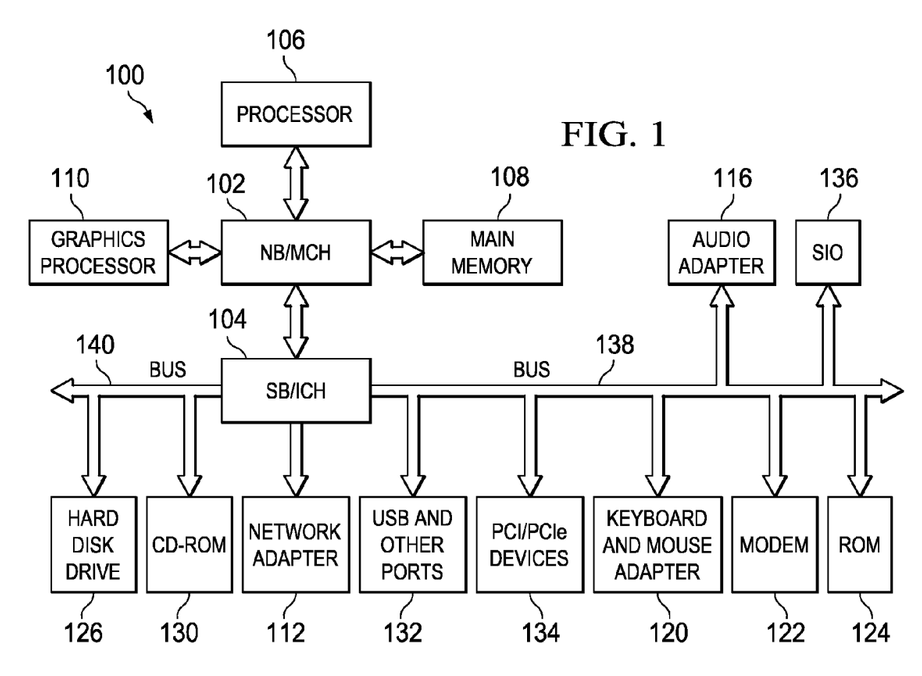
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for associating operating system native role to a console role and assigning the console role to an administrative user name. An administrative user name is a login identifier to a system administrator. Accordingly, data processing tools that implement graphical user interfaces comprised of input interfaces may be applied to tasks that were formerly manually driven by command-line interaction with data processing system functionality.

Figure 2A:
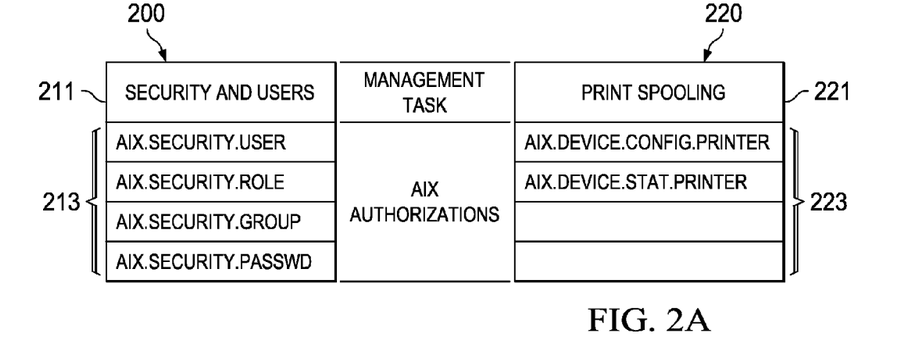
FIG. 2A shows data structures in accordance with an illustrative embodiment of the invention.

FIG. 2A shows data structures in accordance with an illustrative embodiment of the invention. A management task is a set of functionality of an operating system associated with one or more operating system native roles.

A management task can be an application operating on a data processing system that provides navigation, data entry, and other features to a system administrator in order that the system administrator may perform a task. A management task can be, for example, security and users, print spooling, among others. For example, the management task, "security & users" 211 may be associated with a group of AIX authorizations 213, such as, for example, AIX.SECURITY USER, and AIX.SECURITY ROLE in data structure 200. As another example, the management task "print spooling" 221 is associated with a group of AIX authorizations 223, for example, AIX.DEVICE.CONFIG.PRINTER in data structure 220.

An authorization descriptor is a data structure, which contains a description of the authorizations that are required to perform a management task. An authorization descriptor can be, for example, data structure 200 for "security & users" or data structure 220 for "Print spooling". Each management task, above, may have a corresponding console role. A console role is an application name and corresponding management task that may be accessible by selection of a navigation element, defined below. The management task may depend on a number of operating system native roles. Thus, the console role is the combined authorizations or permissions bundled together to accomplish the management task within the ISC.

Figure 2B:
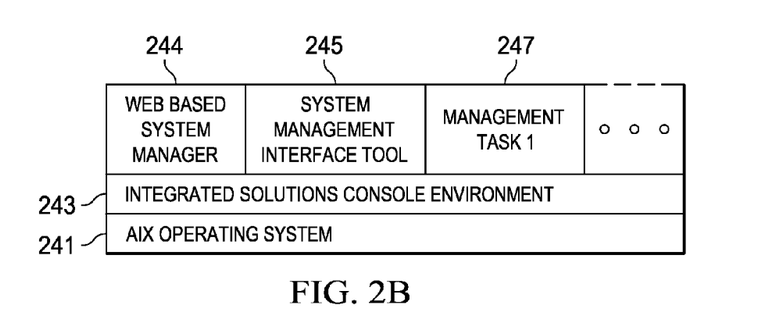
FIG. 2B is a block diagram of software components used to create and use the authorization descriptors in accordance with an illustrative embodiment of the invention.

FIG. 2B is a block diagram of software components used to create and use the authorization descriptors in accordance with an illustrative embodiment of the invention. An operating system, such as AIX operating system 241 may provide access to utilities, security and housekeeping functions of a data processing system, such as, for example, data processing system 100 of FIG. 1. A console, such as integrated solutions console (ISC) 243, may provide a graphical user interface to provide a workflow for system administrators, context sensitive help, among other things. Higher level functions such as web based system manager 244, system management interface tool 245, and management task 1 247 may be supported by the operating system and console. Therefore, two or more management tasks may be supported accordingly. A management task or management application is an application operating on a data processing system that provides navigation, data entry, and other features to a system administrator in order that the system administrator may perform a task. A management task can be, for example, software installation and maintenance, print spooling, system storage management, and the like.

Figure 2C:
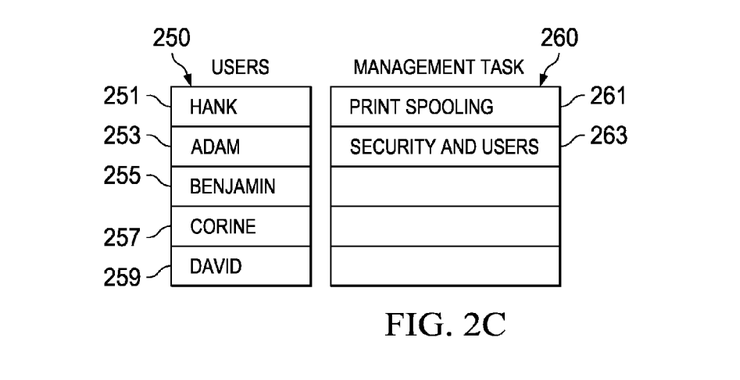
FIG. 2C is a data structure of users and management tasks in accordance with an illustrative embodiment of the invention.
Figure 3:
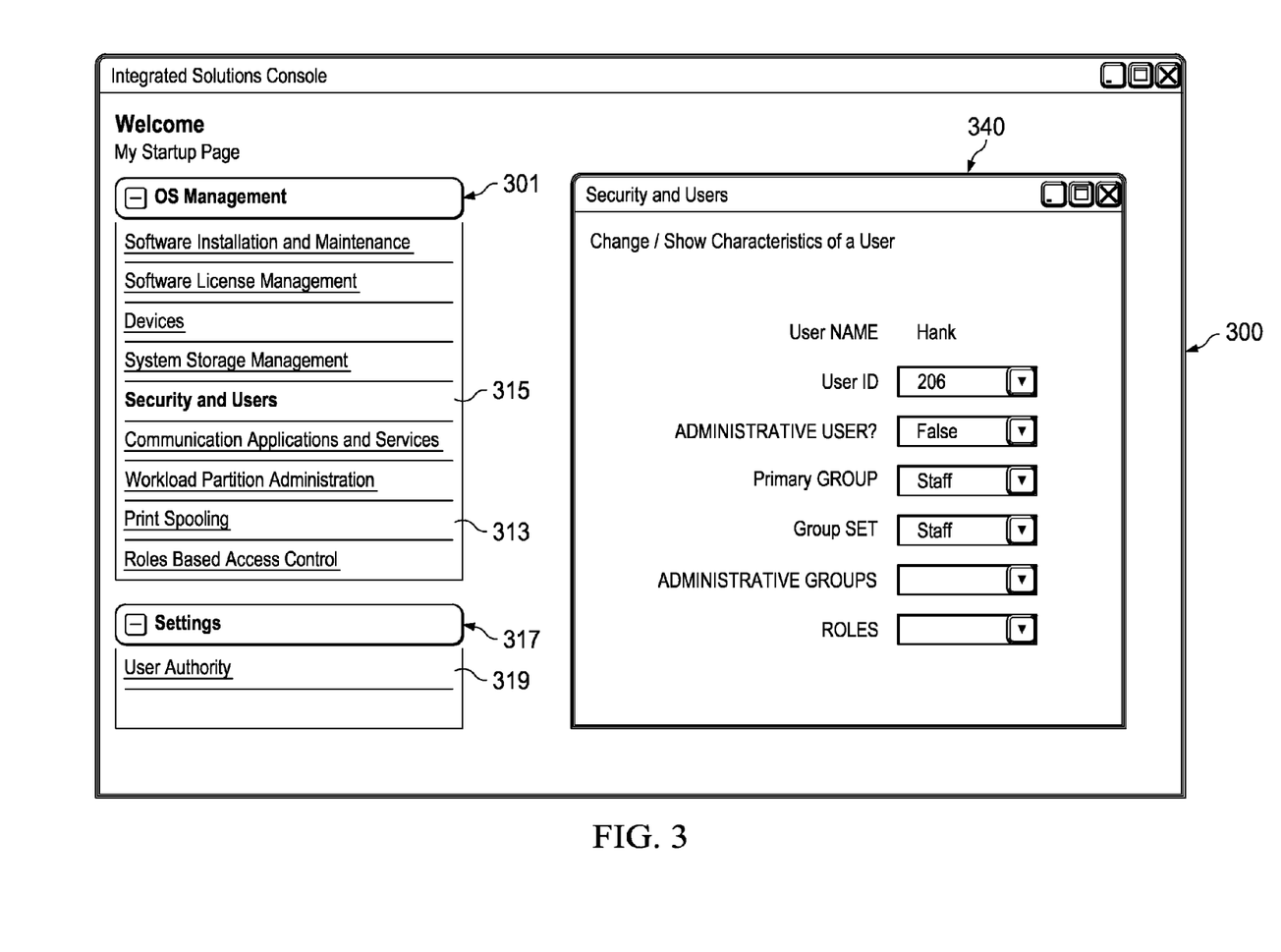
FIG. 3 is a user interface displayed on a data processing system in accordance with an illustrative embodiment of the invention.

FIG. 2C is a data structure of users and management tasks in accordance with an illustrative embodiment of the invention. User data structure 250, includes a list of user names. Each user name may be coupled to a user identifier which may be a number uniquely assigned to the user name. A user name may be a person's name, and may correspond to a console user. A console user is a user that has privileges to access a console, as depicted in FIG. 3, below. User names may include, for example, "Hank" 251, "Adam" 253, "Benjamin" 255, "Corine" 257, and "David" 259.

A management task data structure is a list of tasks that may be performed at the request of a user on a data processing system. Management task data structure 260 may be a list that includes, for example, management tasks such as "print spooling" 261, and "Security and Users" 263. The management tasks may be labels that appear in a navigation element described further below. Each management task may include a string suitable for inclusion in a graphical user interface comprised of input interfaces. An input interface is a navigation element or an input feature or control. An input interface can be, for example, a hypertext link, a radio button, a text field, a drop-down list, among others. A user may interact with an input interface in a number of ways. These ways include, for example, mouse input, keyboard input, and voice input, among others. A navigation element is a user interface that presents a stylized text and responds to mouse and keyboard inputs when the navigation element is the focus of user input. Navigation elements include, for example, "print spooling" 313 and "Security and Users" 315. A navigation element may use a string corresponding to a management task. Accordingly, to facilitate use by users of the data processing system, a system administrator may flexibly describe the navigation element.

FIG. 3 is a user interface displayed on a data processing system in accordance with an illustrative embodiment of the invention. Window 300 may be a console. Window 300 may be divided into two parts. One part may be a navigation tree comprised of navigation elements and categories of navigation elements. Categories may include "OS management" 301 and "Settings" 317. A category is a name for a group of management tasks that may share common features. The category may be established by developers of the console to cover certain management tasks. The navigation tree may permit levels of detail to be expanded or hidden based on a toggled setting actuated by a user control near the category name. Each level of detail may be a pick-list. A pick-list may comprise two or more selectable navigation elements. The pick-list under "OS management" 301 includes navigation elements "Security and Users" 315, as well as "Print Spooling" 313. A user may make a user selection to choose one of the navigation elements. A user selection may be a keyboard entry, a pointer gesture, or a combination of the two inputs that allow a user to select a navigation element for detailed action. Detailed action can include rendering a window to the display in order to collect further user input or provide further details to the user.

A second part of window 300 may be a management application part. A management application part may be, for example, a subwindow, a dialog user interface, or a pop-up window. A dialog user interface is a window that offers a user at least one field to enter information. The dialog may include a submit button that can be accessed via a mouse or other pointer device. Entries made to the one or more fields may be stored to a data structure of an illustrative embodiment of the invention. FIG. 3 depicts management application part as subwindow 340.

Figure 4A:
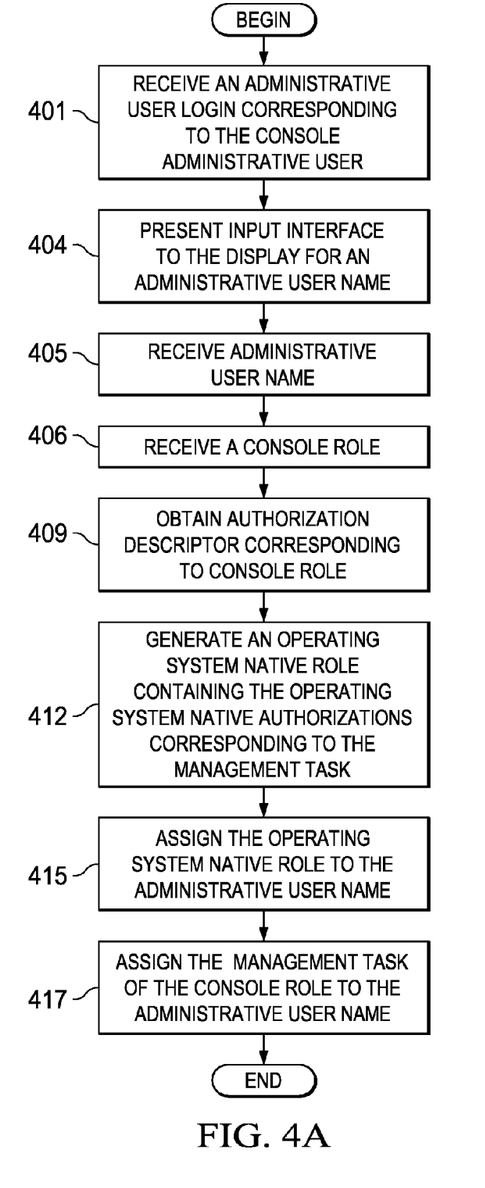
FIG. 4A is a flowchart of steps performed based on a console administrative user input to authorize an administrative user in accordance with an illustrative embodiment of the invention.

FIG. 4A is a flowchart of steps performed based on a console administrative user input to authorize an administrative user in accordance with an illustrative embodiment of the invention. A console administrative user is a user that is allowed a maximum number and range of privileges on a data processing system. Initially, an ISC receives an administrative user login corresponding to the console administrative user (step 401). Responsive to receiving a correct login of the console administrative user, the ISC may present an input interface to the display for entry of an administrative user name (step 404). Thus, the ISC may receive an administrative user name (step 405). In addition, the ISCC may provide an input interface for a console role. Accordingly, the ISC may receive a console role (step 406).

The console user may access this input interface by selecting, for example, "User Authority" management task 319 of FIG. 3. Accordingly, the ISC may collect this information by presenting subwindow 340 of FIG. 3. An operating system native role is a name for one or more operating system operations that are bundled together for convenience. Likewise, an operating system native role is the one or more operating system operations that are bundled together for convenience. An operating system native role may be, for example, an AIX role. An AIX role is any grouping of AIX authorizations or Advanced Interactive eXecutive authorizations that a system administrator defines. The system administrator may assign a name to the AIX role or grouping of AIX authorizations. AIX roles may be stored to a role registry, which is a database maintained by the AIX operating system.

Next, the ISC may obtain an authorization descriptor corresponding to the console role (step 409). The authorization descriptor can be, for example, authorization descriptor 220 of FIG. 2A. Thus, as an example, a console administrative user may set for an administrative user "Hank" (from step 405) a console role of "aixPrinters", obtained in step 406. In this example, the ISC looks up the authorization descriptor for the console role of "Print spooling" that is associated with aixPrinters to obtain authorization descriptor 220 of FIG. 2A. Next, the ISC may generate an operating system native role containing the operating system native authorizations corresponding to the management task (step 412). Step 412 may involve selecting an operating system native role that contains, at a minimum, the operating system native authorizations indicated in the authorization descriptor obtained in step 409. For example, there may be, pre-existing, a operating system native role "My_Printers" that contains, for example, operating system native authorizations for an AIX data processing system, including, aix.device.config.printer and aix.device.stat.printer. Since such an operating system native role includes the operating system native authorizations described in authorization descriptor 220, the ISC assigns the "My_Printers" operating system native system role to the operating system native authorizations of authorization descriptor 220.

Next, the ISC assigns the operating system native role to the administrative user name (step 415). Next, the ISC assigns the management task of the console role to the administrative user name (step 417). Accordingly, the administrative user name may be used as a key to obtain both the navigation element associated with the management task, as well as providing necessary authorizations or permissions that underpin the user interface presented in FIGS. 5 and 6, below, to the administrative user name used in this flowchart. As explained above, the management task can be expressed verbatim as the navigation element in the user interface. Consequently, the data processing system may allow or disallow the administrative user's access to functions based on whether a management task depends upon an operating system native role. Processing may terminate thereafter.

Figure 4B:
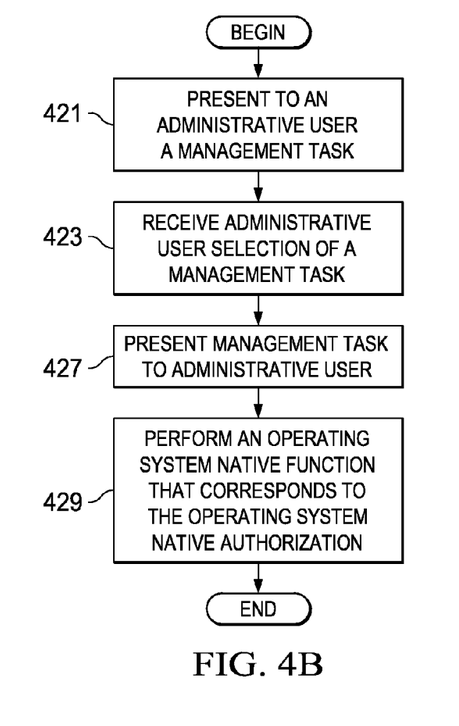
FIG. 4B is a flowchart of steps that may be performed after adding a console role to an administrative user's list of console roles in accordance with an illustrative embodiment of the invention.

FIG. 4B is a flowchart of steps that may be performed subsequent to adding a console role to an administrative user's list of console roles. Initially, the ISC presents to the administrative user a management task (step 421). The management task may be, for example, "Print spooling". Next, the ISC receives an administrative user selection of a management task (step 423). Next, the ISC may present the management task to the administrative user (step 427). Next, the ISC may perform an operating system native function that corresponds to the operating system native authorization in support of the management task (step 429). For example, the operating system native authorization may be available in the authorization descriptor coupled to the user. An operating system native function is a function of the operating system that a user is authorized to access based on an operating system native authorization associated with the user. After step 429, processing may terminate.

Figure 5:
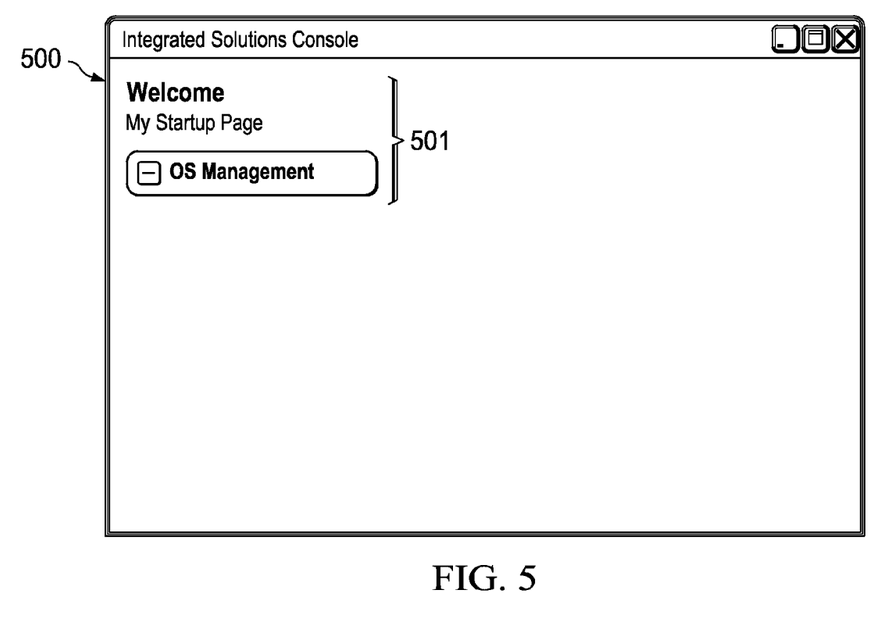
FIG. 5 is a user interface showing a navigation tree in accordance with an illustrative embodiment of the invention.

FIG. 5 is a user interface showing a navigation tree in accordance with an illustrative embodiment of the invention. ISC window 500 may include a navigation tree 501 by which an administrative user may exercise system privileges.

Figure 6:
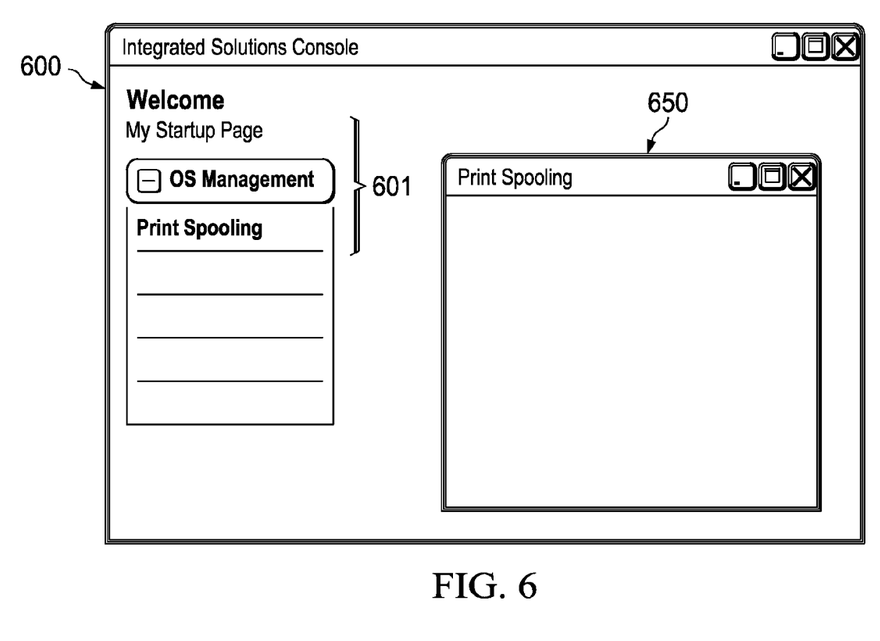
FIG. 6 is a user interface that has received one or more navigation inputs in accordance with an illustrative embodiment of the invention.

FIG. 6 is a user interface that has received one or more navigation inputs in accordance with an illustrative embodiment of the invention. ISC window 600 corresponds to ISC window 500 of FIG. 5, except that ISC window 600 may be later than ISC window 500. Navigation tree 601 may be a navigation tree where navigation elements have been exposed after an administrative user has opened a category twistie. In addition, an ISC may have opened management task subwindow 650 in response to selection of the navigation element "print spooling".

It is appreciated that the various illustrative embodiments are provided only by way of example. Further embodiments may be implemented, for example, by implementing the input interfaces within a dialog user interface. In addition, the input interfaces may be accessible within a portlet. A portlet is a visible active component presented to a user within a portal page. A portal page provides a secure, single point of interaction with diverse information, business processes, and people, personalized to a user's needs and responsibilities. A portlet may be, for example, a Java servlet that operates inside a portal page.

The illustrative embodiments permit an administrative user to operate a graphical user interface, for example an integrated solutions console to access and control user authorizations in an operating system. Accordingly, command line control of the piecemeal steps to form a console role may be consolidated into a task flow that automates the delegation of authority to system administrators.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing authorizations to an administrative user, the method comprising:
receiving an administrative user login corresponding to a root user;
presenting a list of at least one management task, that is subsequently selected by the root user;
presenting at least one graphical user interface to a display for an administrative user name and at least one console role, wherein the administrative user name is not a user name corresponding to the administrative user login;
receiving the administrative user name and a console role, through the graphical user interface, wherein the graphical user interface is a portlet;
obtaining an authorization descriptor, by a category of management tasks, and then selecting from a menu, a field marked as the authorization descriptor, that can be used to couple the administrative user name and the console role, wherein the authorization descriptor is a data structure, which contains a description of the authorizations that are required to perform a management task, wherein the administrative user name is a login identifier to a system administrator;

generating an operating system native role by adding at least one authorization to the authorizations, wherein the operating system native role is an Advanced Interactive eXecutive (AIX) role comprising at least two AIX authorizations;
assigning the operating system native role to the administrative user name; and
assigning to the administrative user name the authorizations of the management task, by reference to the management task.

2. The computer implemented method of claim 1, further comprising:
presenting the management task based on the authorization descriptor;
receiving an administrative user selection of the management task; and
performing operating system native tasks based on operating system native authorizations referenced by the console role.

3. The computer implemented method of claim 1, wherein receiving the console role comprises receiving a user selection from a drop-down pick list.

4. The computer implemented method of claim 1, wherein the graphical user interface is a dialog user interface that provides at least one field to enter information.

5. A computer program product for providing authorizations to an administrative user, the computer program product comprising: a computer usable tangible storage device having computer usable program code embodied therewith, the computer program product comprising:
computer usable program code configured to receive an administrative user login corresponding to a root console administrative user;
computer usable program code configured to present a list of at least one management task, that is subsequently selected by the root user;
computer usable program code configured to present at least one graphical user interface to a display for an administrative user name and at least one console role, wherein the administrative user name is not a user name corresponding to the administrative user login, through the input interface, wherein the input interface is a portlet;
computer usable program code configured to receive the administrative user name and a console role, through the graphical user interface, wherein the graphical user interface is a portlet; and
computer usable program code configured to obtain an authorization descriptor, by a category of management tasks, and then selecting from a menu, a field marked as the authorization descriptor, wherein the authorization descriptor can be used to couple the administrative user name and the console role, wherein the authorization descriptor is a data structure, which contains a description of the authorizations that are required to perform the management task, wherein the administrative user name is a login identifier to a system administrator;
generating an operating system native role by adding at least one authorization to the authorizations, wherein the operating system native role is an Advanced Interactive eXecutive (AIX) role comprising at least two AIX authorizations;
assigning the operating system native role to the administrative username; and
assigning to the administrative user name the authorizations of the management task, by reference to the management task.

6. The computer program product of claim 5, further comprising:
computer usable program code configured to present the management task based on the authorization descriptor;
computer usable program code configured to receive an administrative user selection of the management task; and
computer usable program code configured to perform operating system native tasks based on operating system native authorizations referenced by the console role.

7. The computer program product of claim 5, wherein computer usable program code configured to receive the console role comprises computer usable program code configured to receive a user selection from a drop-down pick list.

8. The computer program product of claim 5, wherein the graphical user interface is a dialog user interface that provides at least one field to enter information.

9. A data processing system comprising:
a bus;
a storage device connected to the bus, wherein computer usable code is located in the storage device;
a communication unit connected to the bus;
a processing unit connected to the bus, wherein the processing unit executes the computer usable code to provide authorizations to an administrative user, wherein the processing unit executes the computer usable program code to receive an administrative user login corresponding to a root console administrative user; present a list of at least one management task, that is subsequently selected by the root user; present at least one graphical user interface to a display for an administrative user name and at least one console role; receive the administrative user name and a console role, wherein the administrative user name is not a user name corresponding to the administrative user login, through the graphical user interface, wherein the graphical user interface is a portlet; obtain an authorization descriptor, by a category of management tasks, and then selecting from a menu, a field marked as the authorization descriptor, that can be used to couple the administrative user name and the console role, wherein the authorization descriptor is a data structure, which contains a description of the authorizations that are required to perform a management task, wherein the administrative user name is a login identifier to a system administrator; generate an operating system native role by adding at least one authorization to the authorizations, wherein the operating system native role is an Advanced Interactive eXecutive (AIX) role comprising at least two AIX authorizations; assign the operating system native role to the administrative user name; and assign to the administrative user name the authorizations of the management task, by reference to the management task.

10. The data processing system of claim 9, wherein the processing unit further executes computer usable code to present the management task based on the authorization descriptor; receive an administrative user selection of the management task; and perform operating system native task based on operating system native authorization reference by the console role.

11. The data processing system of claim 9, wherein in executing computer usable code to receive the console role the processing unit further executes computer usable code to receive a user selection from a drop-down pick list.

12. The data processing system of claim 9, wherein the graphical user interface is a dialog user interface that provides at least one field to enter information.

13. The method of claim 1, wherein the console role is at least two authorizations to use at least two applications combined to, as a whole, permit the administrative user to perform the management task.

* * * * *